UNITED STATES PATENT OFFICE.

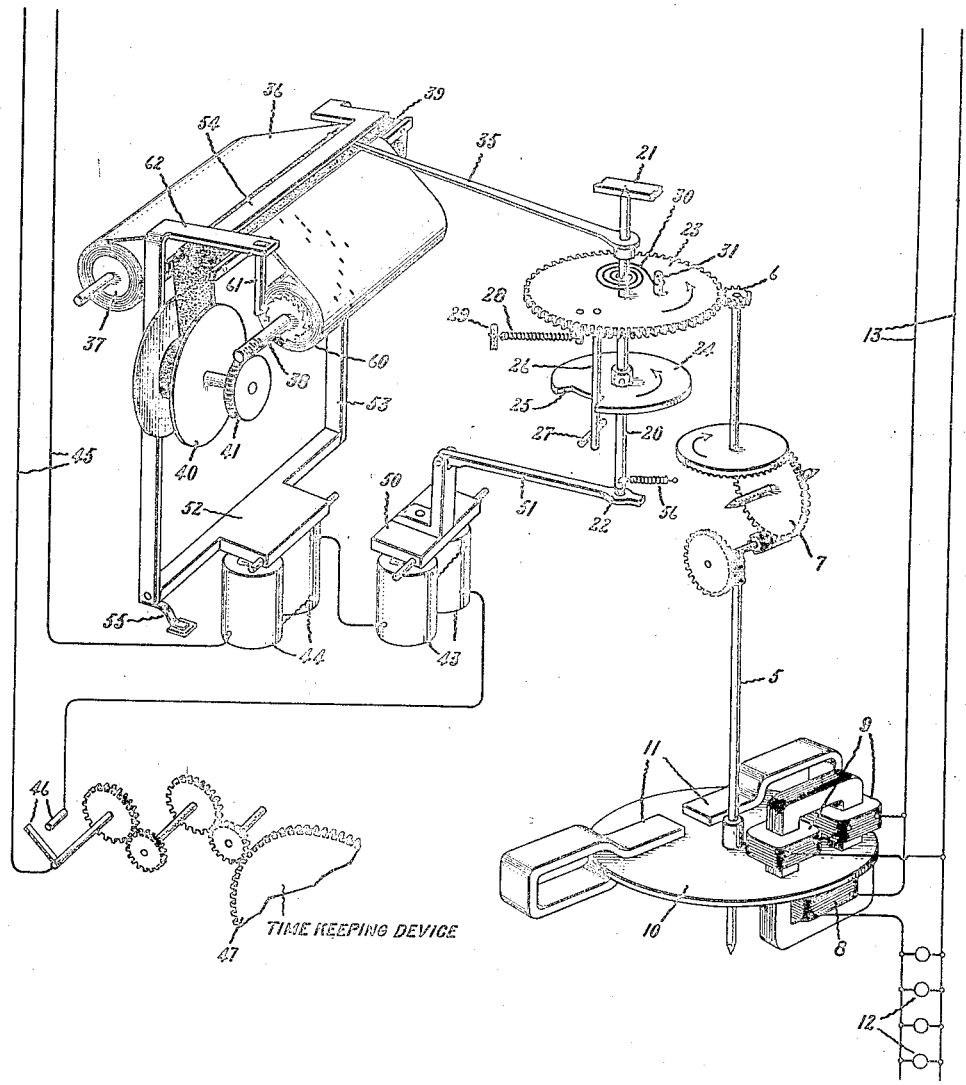

LEWIS T. ROBINSON, OF SCHENECTADY, NEW YORK, ASSIGNOR TO GENERAL ELECTRIC COMPANY, A CORPORATION OF NEW YORK.

DEMAND APPARATUS.

1,227,320.　　　　　Specification of Letters Patent.　　Patented May 22, 1917.

Application filed September 29, 1916. Serial No. 122,923.

*To all whom it may concern:*

Be it known that I, LEWIS T. ROBINSON, a citizen of the United States, residing at Schenectady, county of Schenectady, State of New York, have invented certain new and useful Improvements in Demand Apparatus, of which the following is a specification.

My invention relates to demand apparatus and particularly to apparatus for recording the character and magnitude of the demand made by an electrical installation upon a certain generating station. Broadly, the invention has for its object the provision of an improved demand apparatus.

A large number of different types of demand apparatus, or demand indicators, have already been developed, and several of these types of demand apparatus are today in use. The type of apparatus most generally used at the present time measures the demand during each of a number of equal intervals of time, and records either the demand during each of these equal time intervals or the maximum demand occurring during any one of such equal time intervals. My present invention relates particularly to demand apparatus of this type, and has for its object the provision of certain improvements in the construction and operating mechanism of demand apparatus of this type.

The novel features of the invention which I believe to be patentable are definitely indicated in the claims appended hereto. The invention itself and its application to and embodiment in demand apparatus will be best understood from the following description taken in conjunction with the accompanying drawing, in which:

The figure is a diagrammatic perspective view of a demand apparatus embodying my present invention.

In the drawings, there is diagrammatically represented a rotatable meter shaft 5, arranged to drive a pinion 6 through a train of gearing 7. The meter illustrated is of the induction type and comprises a series coil 8 and potential coils 9 positioned respectively on opposite sides of a disk armature 10 of suitable conducting material, such for example as aluminum. The disk armature 10 rotates between the air gaps of permanent damping magnets 11 and is secured to the shaft 5, all as well understood by those skilled in the art. In the accompanying drawing the meter is represented as connected to measure the electric energy supplied to translating devices 12 from alternating current supply mains 13.

A shaft 20 is rotatably mounted between a fixed pivot bearing 21 and a movable pivot bearing 22. The shaft 20 is substantially parallel to the meter shaft 5. A gear or actuator 23 is loosely mounted on the shaft 20 and is adapted to mesh with the meter-driven pinion 6. A disk 24 having a peripheral recess or slot 25 is secured to the shaft 20. A pin 26 depends from the gear 23 and extends through the recess 25. The pin 26 is adapted to engage a fixed stop pin 27 thereby determining the initial position of the gear 23. When the disk 24 is in its initial position the righthand end of the recess 25 engages the pin 26. The various parts are shown substantially in their initial positions in the drawing.

A spring 28 is secured at one end to the gear 23 and at the other end to a fixed pin 29. The spring 28 thus tends to turn the gear 23 in a backward direction toward its initial position, or in other words in a direction opposite to that in which the gear is normally turned by the meter-driven pinion 6. A spiral spring 30 is secured at one end to the shaft 20 and at the other end to a pin 31 extending from the gear 23.

A pointer or indicating member 35 is secured to the shaft 20 and is adapted to sweep across a record chart 36. The unused portion of the record chart 36 is wound on a cylindrical roll 37. The used portion of the record chart is adapted to be wound on a second cylindrical roll carried by a shaft 38. An inked ribbon 39 extends transversely across the record chart 36 and between the chart and the indicator 35 and is adapted to be wound on a spool 40. The spool 40 is operatively connected to the shaft 38 by worm gearing 41. The pointer 35 is in the nature of a recording element, and its position with respect to the record chart is adapted to be recorded as hereinafter fully described. It is to be noted here, however, that the pointer is normally maintained out of contact with the record chart, and hence there is no friction between the pointer and the chart.

Two pairs of electromagnets 43 and 44 are adapted to be energized at the end of each of a number of equal intervals of time. The electromagnets 43 and 44 are connected in series and are arranged to be periodically connected across the direct current mains 45 by means of a pair of time-actuated contacts 46. The movable member of the time-actuated contacts 46 may be driven from any suitable time-keeping mechanism, such as a constant speed electric motor, a clock, or the like. Such a time-keeping device is indicated in the drawing by reference numeral 47.

The electromagnet 43 has a coöperating movable armature 50 to which is secured an arm 51. The pivot bearing 22 of the shaft 20 is located at the outer end of the arm 51. Thus when the electromagnet 43 is energized the lower end of the shaft 20 is moved toward the left, as viewed in the accompanying drawing, whereby the gear 23 is disengaged from the meter-driven pinion 6. The electromagnet 44 has an armature 52 to which is secured a bail member 53 having a horizontal striker rod 54 positioned above the inked ribbon 39. Thus, when the electromagnet 44 is energized the bail member 53 is swung toward the left, as viewed in the accompanying drawing, whereupon the striker rod 54 imparts a sharp blow on the indicator 35 thereby making an impression on the record chart 36 of the position of the indicator. A leaf spring 55 is preferably provided to quickly raise and hold the striker arm 54 in its elevated position upon and during the deënergization of the electromagnets 44. Similarly, a spring 56 is preferably provided for normally holding the pinion 6 and gear 23 in operative engagement.

A ratchet 60 is secured to the shaft 38. A pawl 61 is loosely pivoted to an arm 62 at the top of the bail member 53. When the electromagnet 44 is energized the pawl 61 engages beneath one of the teeth of the ratchet 60, and, upon the deënergization of this electromagnet, the pawl operates to turn the ratchet and hence the shaft 38 through a predetermined angle. At the same time the worm gearing 41 imparts a corresponding movement to the spool 40. Thus, each time that the electromagnet 44 is energized and subsequently deënergized the record chart 36 is ratcheted ahead a predetermined distance and a certain amount of the inked ribbon is wound up on the spool 40. It will, of course, be understood that other means for moving the record chart and inked ribbon may be employed if desired, and I do not wish to be limited to the specific construction I have illustrated for explanatory purposes.

The operation of the apparatus is as follows: The meter shaft 5 rotates at a speed dependent upon the rate of energy consumption in the translating devices 12. The pinion 6 thus drives the gear 23 and the latter drives the shaft 20, through the pin 26 and the disk 24, in the directions indicated by the arrows on the drawing. The indicator 35 is, accordingly, moved across the record chart in a counter-clockwise direction, as viewed in the drawing, at a speed proportional to the energy consumption, and the distance the indicator moves from its initial position is, therefore, a measure of the amount of energy consumed. Rotation of the meter shaft 5 is thus mechanically and continuously transmitted to the indicator, thereby avoiding the difficulties which have heretofore been experienced in transmitting the motion of the meter shaft to the indicator by electrical means, such, for example, as a meter-controlled electric circuit. At the end of each equal interval of time, the contacts 46 complete the circuit of the series-connected electromagnets 43 and 44. The time interval may be of any desired length and will be determined by the particular circumstances of the installation in question. In some instances as short a time interval as one minute may be used, while in others an interval of one hour may be desirable. Generally, however, the time interval will be between the values given, as, for example, 15 or 30 minutes.

When the electromagnets 43 and 44 are energized the pivot bearing 22 is pulled toward the left, as viewed in the drawing, thereby disengaging the gear 23 and pinion 6. At the same time the striker rod 54 imparts a blow on the indicator 35, and the indicator is firmly held between the striker rod and the record chart until the electromagnet 44 is deënergized. As soon as the gear 23 and the pinion 6 are unmeshed, the spring 28 operates to return the gear 23 to its initial position, that is, with the pin 26 resting against the fixed stop 27. The peripheral recess 25 is of such circumferential length that the disk 24 does not interfere with the return of the gear 23 to its initial position, even when the indicator has been moved its maximum distance during the time interval. The indicator 35, the shaft 20 and the disk 24 are held in the positions they occupy at the end of the time interval by the engagement of the indicator between the striker rod and the record chart. As soon as the electromagnet 44 is deënergized, the striker rod is elevated, thereby releasing the indicator 35. The spring 30 now returns the disk 24, the shaft 20, and the indicator 35 to their respective initial positions, as determined when the right end of the recess 25 rests against the pin 26. The electromagnet 43 is simultaneously deënergized, and the pinion 6 and gear 23 can again come into mesh, and the cycle of operations is repeated. As previously stated, after each record has been made, the chart is advanced a short distance by the pawl and ratchet arrangement 61—60. Each record is thus distinguishable, and the maximum demand, the normal average demand, and abnormally large demands, together with the frequency of and time of occurrence of any such demands, can all be obtained from the record.

It will be evident from the foregoing description that I have provided a very simple form of demand indicator, which gives all the information concerning the magnitude and character of the demand of an electrical installation which it is necessary or desirable to know in the vast majority of cases. The apparatus consists of few parts which are so arranged as to minimize the possibility of the apparatus getting out of order and of the failure of the apparatus to properly operate. The apparatus contains no delicate contacts whose failure to operate might be decidedly objectionable. The contacts 46 may be very easily designed for their particular use in the apparatus, and little or no difficulty need be experienced in their operation. The mechanical drive of the indicator from the meter is simple and satisfactory, and the likelihood of a failure in the operation of this mechanical drive is extremely remote. The indicator or recording element moves to its final position during each interval without being in contact with the record chart, and the load on the watthour meter is consequently very light and practically negligible. The indicator or recording element is, furthermore, directly connected to the meter shaft by mechanical gearing, and hence its motion is continuous and without steps, as is the case in many present-day devices of this type.

Those skilled in the art will appreciate that my invention is susceptible of numerous modifications, and, accordingly, I do not desire to limit myself to the particular construction herein described. I, therefore, aim in the appended claims to cover all modifications which are within the spirit and scope of my invention.

What I claim as new and desire to secure by Letters Patent of the United States, is:

1. A demand apparatus comprising an electric meter having a rotatable shaft, a second rotatable shaft, a gear loosely mounted on said second shaft, means operatively connecting said gear to the meter shaft, means whereby said gear operates to drive said second shaft when the gear is driven by the meter shaft and whereby said gear can move in the opposite direction without moving said second shaft, means for interrupting the operative engagement between said meter shaft and said gear at the end of each of a number of predetermined equal intervals of time, means for returning said gear to its initial position when the operative engagement between the gear and the meter shaft is interrupted, means for returning said second shaft to its initial position after said gear has returned to its initial position, and means for obtaining an indication of the maximum movement of said second shaft.

2. A demand apparatus comprising an electric meter having a rotatable shaft, a second rotatable shaft, a gear loosely mounted on said second shaft, means operatively connecting said gear to the meter shaft, a disk secured to said second shaft and having a peripheral slot, a pin secured to said gear and extending through the peripheral slot in said disk whereby the gear is adapted to drive said second shaft when the gear is driven by the meter shaft and whereby the gear can turn loosely on said second shaft in a backward direction without moving said second shaft, said gear and said second shaft having initial position in which said pin is located near one end of the slot in said disk so that forward movement of the gear causes a corresponding movement of the second shaft, means for interrupting the operative engagement between said meter shaft and said gear at the end of each of a number of predetermined equal intervals of time, a spring adapted to turn said gear in a backward direction when the operative engagement between the gear and the meter shaft is interrupted whereby the gear is returned to its initial position, a spiral spring connected at one end to said gear and at the other end to said second shaft whereby said second shaft is returned to its initial position when said gear is returned to its initial position, and means for obtaining an indication of the maximum movement of said second shaft.

3. A demand apparatus comprising an electric meter having a rotatable shaft, a second rotatable shaft, a gear loosely mounted on said second shaft, means operatively connecting said gear to the meter shaft, a disk secured to said second shaft and having a peripheral slot, a pin secured to said gear and extending through the peripheral slot in said disk whereby said gear is adapted to drive said second shaft when the gear is driven by the meter shaft and whereby the gear can turn loosely on said second shaft in a backward direction without moving said second shaft, said gear and said second shaft having initial positions in which said pin is located near one end of the slot in said disk so that forward movement of the gear causes a corresponding movement of the second shaft, means for interrupting the operative engagement between said meter shaft and said gear at the end of each of a number of predetermined equal intervals of time, a spring adapted to turn said gear in a backward direction when the operative engagement between the gear and the meter shaft is interrupted whereby the gear is returned to its initial position, a record chart, an indicator operatively connected to said second shaft and adapted to sweep across said chart, means for recording on said chart the position of said indicator each time the operative engagement between said gear and the meter shaft is interrupted, and a spiral spring connected at one end to said gear and at the other end to said second shaft whereby said second shaft is returned to its initial position after the position of said indicator has been recorded.

4. A demand apparatus comprising an electric meter having a rotatable shaft, a second rotatable shaft, a record chart, an indicator operatively connected to said second shaft and adapted to sweep across said record chart, an actuator loosely mounted on said second shaft, means operatively connecting said actuator to the meter shaft, means whereby said actuator operates to drive said second shaft when the actuator is driven by the meter shaft and whereby said actuator can move in a backward direction without moving said second shaft, means for interrupting the operative engagement between said meter shaft and said actuator at the end of each of a number of predetermined equal intervals of time, means for returning said actuator to its initial position when the operative engagement between the actuator and the meter shaft is interrupted, means for recording on said chart the position of said indicator each time the operative engagement between said actuator and the meter shaft is interrupted, and means for returning said shaft to its initial position after the position of said indicator has been recorded.

5. A demand apparatus comprising an electric meter having a rotatable shaft, a second rotatable shaft, a record chart, an indicator operatively connected to said second shaft and adapted to sweep across said record chart, means operatively connecting said second shaft to said meter shaft whereby the second shaft is driven by the meter shaft and whereby the second shaft can move in a backward direction without moving the meter shaft, means for interrupting the operative engagement between said two shafts at the end of each of a number of predetermined equal intervals of time, means for recording on said chart the position of said indicator each time the operative engagement between said actuator and the meter shaft is interrupted, means for returning said second shaft to its initial position after the position of said indicator has been recorded, and means for moving said record chart a predetermined distance each time a record is made on the chart by said recording means.

6. A demand apparatus comprising an electric meter having a rotatable shaft, an indicator, mechanical means operatively connecting said indicator to said shaft, a record chart coöperating with said indicator, means for interrupting the operative engagement between said indicator and the meter shaft at the end of each of a number of predetermined equal intervals of time, means for recording on said chart the position of said indicator each time the operative engagement between the indicator and the meter shaft is interrupted, means for returning said indicator to its initial position each time its position has been recorded on said chart, and means for moving said record chart a predetermined distance each time a record is made on the chart by said recording means.

7. A demand apparatus comprising a graphic recording indicator having an initial position, a record chart coöperating with said indicator, a rotatable member for winding up said record chart, a ratchet secured to said member, an inked ribbon positioned between said record chart and said indicator, a spool upon which said ribbon is adapted to be wound, gearing operatively connecting said spool to said member, an electromagnet having a movable armature, a bail member secured to said armature and adapted to force said indicator against said ribbon when the electromagnet is energized, a pawl mounted on said bail member and adapted to engage beneath a tooth of said ratchet when said electromagnet is energized and to turn said member through a predetermined angle upon the deënergizing of said electromagnet, and means for intermittently energizing said electromagnet.

8. A demand apparatus comprising an electric meter having a rotatable shaft, a graphic recording indicator adapted to be operatively connected to said shaft, a record chart coöperating with said indicator, a rotatable member for winding up said record chart, a ratchet secured to said member, an inked ribbon positioned between said record chart and said indicator, a spool upon which said ribbon is adapted to be wound, gearing operatively connecting said spool to said member, an electromagnet having a movable armature, a bail member secured to said armature and adapted to force said indicator against said ribbon when the electromagnet is energized, a pawl mounted on said bail member and adapted to engage beneath a tooth of said ratchet when said electromagnet is energized and to turn said rotatable member through a predetermined angle upon the deënergizing of said electromagnet, means for interrupting the operative engagement between said indicator and the meter shaft at the end of each of a number of predetermined equal intervals of time, means for returning said indicator to its initial position upon the deënergizing of said electromagnet, and means for energizing said electromagnet when the operative engagement between said indicator and the meter shaft is interrupted.

9. A demand apparatus comprising an electric meter having a rotatable shaft, a graphic recording indicator adapted to be operatively connected to said shaft, a record chart coöperating with said indicator, a rotatable member for winding up said record chart, an inked ribbon positioned between said record chart and said indicator, a rotatable spool for winding up said ribbon, means for interrupting the operative engagement between said indicator and the meter shaft at the end of each of a number of predetermined equal intervals of time, means for forcing said indicator against said ribbon each time the operative engagement between the indicator and the meter shaft is interrupted whereby a record is made on said chart, means for turning said rotatable member and said spool through predetermined angles each time a record is made on said chart, and means for returning said indicator to its initial position after the making of each record on said chart.

10. A demand apparatus comprising an electric meter having a rotatable shaft, a record chart, a recording element adapted to sweep across said record chart and normally maintained out of contact therewith, mechanical means operatively connecting said element to said shaft whereby the motion of the shaft is continuously transmitted to said element, means for interrupting the operative engagement between said element and said shaft at the end of each of a number of equal intervals of time, means for recording on said chart the position of said element each time the operative engagement between the element and the shaft is interrupted, and means for returning said element to its initial position each time its position has been recorded on said chart.

In witness whereof, I have hereunto set my hand this 28th day of September, 1916.

LEWIS T. ROBINSON.

---

It is hereby certified that in Letters Patent No. 1,227,320, granted May 22, 1917, upon the application of Lewis T. Robinson, of Schenectady, New York, for an improvement in "Demand Apparatus," an error appears in the printed specification requiring correction as follows: Page 1, line 13, for the word "certain" read *central;* and that the said Letters Patent should be read with this correction therein that the same may conform to the record of the case in the Patent Office.

Signed and sealed this 3rd day of July, A. D., 1917.

[SEAL.]

F. W. H. CLAY,

*Acting Commissioner of Patents.*

Cl. 234—5.5.